May 29, 1945.   C. H. HOWARD   2,377,234
MILKING APPLIANCE
Filed Feb. 1, 1944   2 Sheets-Sheet 1
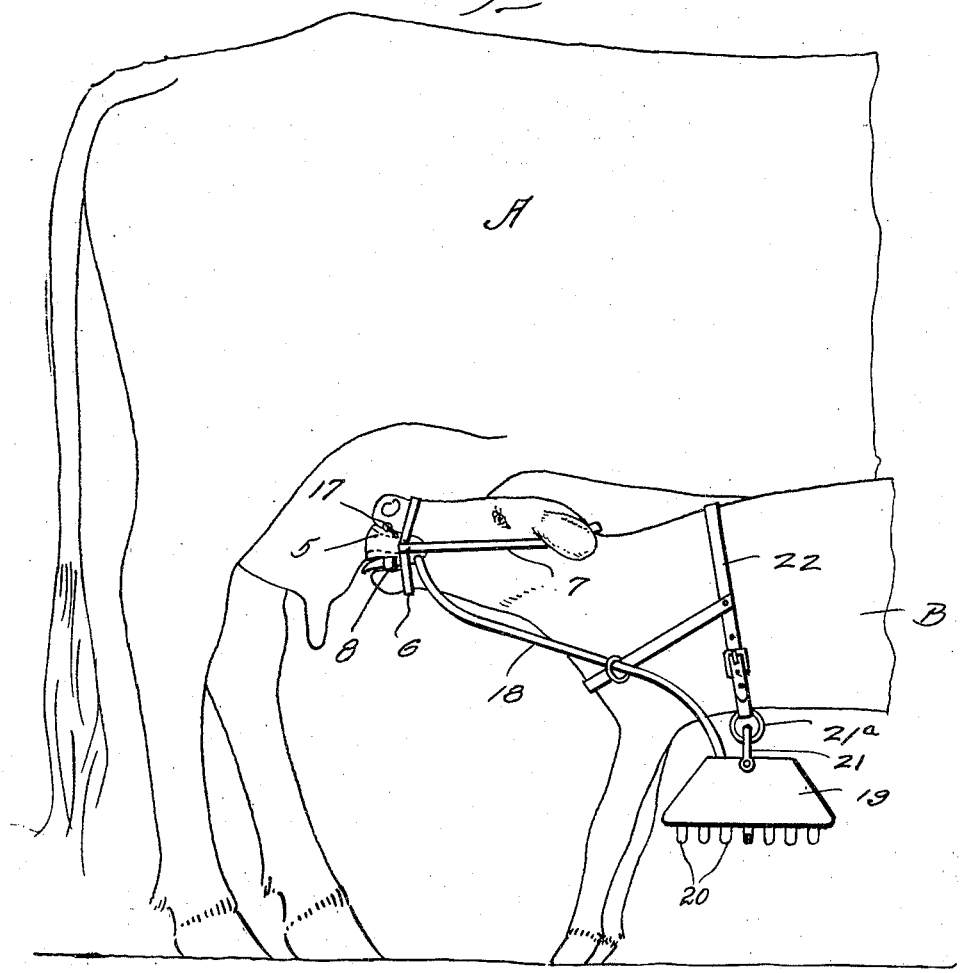
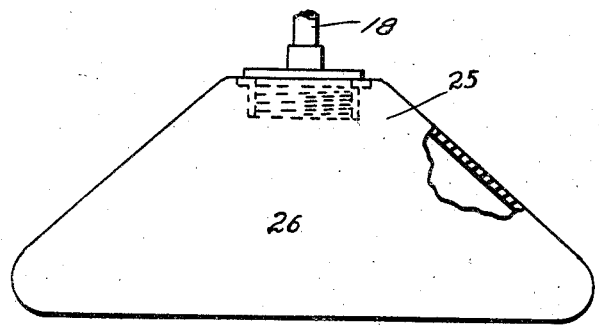
Inventor
Charles H. Howard
By Clarence A. O'Brien
and Harvey B. Jacobson
Attorneys May 29, 1945. C. H. HOWARD 2,377,234
MILKING APPLIANCE
Filed Feb. 1, 1944 2 Sheets-Sheet 2

Inventor
Charles H. Howard
By Clarence A. O'Brien
and Harvey B. Jacobson
Attorneys Patented May 29, 1945

2,377,234

UNITED STATES PATENT OFFICE 2,377,234

MILKING APPLIANCE

Charles H. Howard, Isabel, S. Dak.

Application February 1, 1944, Serial No. 520,655

3 Claims. (Cl. 31—58)

The present invention appertains to new and useful improvements in milking appliance, and more particularly to an appliance for use in conjunction with calves and other young live stock, the principal object being to provide such equipment adapted to be carried by young live stock to the end that the young live stock will nurse their cows longer in order to get their regular feeding, but contemporaneously acquire surplus milk which is lead to a receptacle carried by said young live stock.

Another important object of the invention is to provide a nursing device adapted to be carried by young live stock from which smaller animals can feed.

Other objects and advantages of the invention will become apparent to the reader of the following description.

In the drawings:

Figure 1 represents a fragmentary side elevational view showing a calf milking its cow and showing the milking appliance attached to the calf.

Figure 5 is a fragmentary side elevational view of a modified form of receptacle.

Referring to the drawings wherein like numerals designate like parts, it can be seen that reference character A denotes a cow, while reference character b denotes a calf and the calf is shown in milking position in Figure 1.

Figure 2:
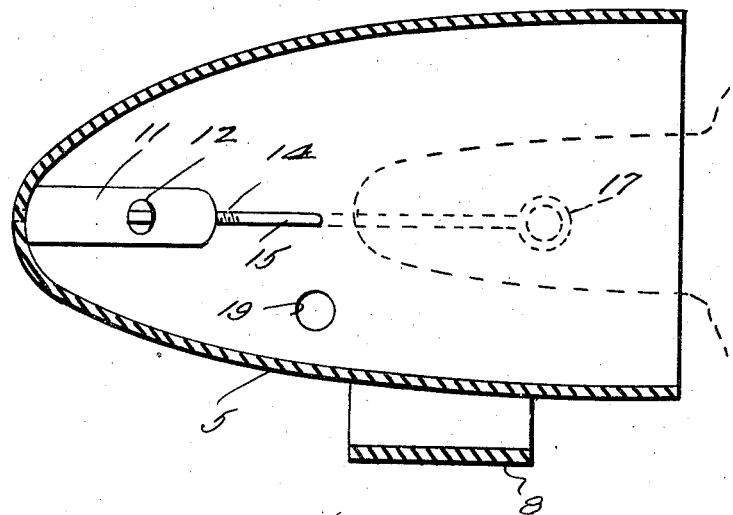
Figure 2 is an enlarged sectional view through the teat-receiving mouthpiece.
Figure 3:
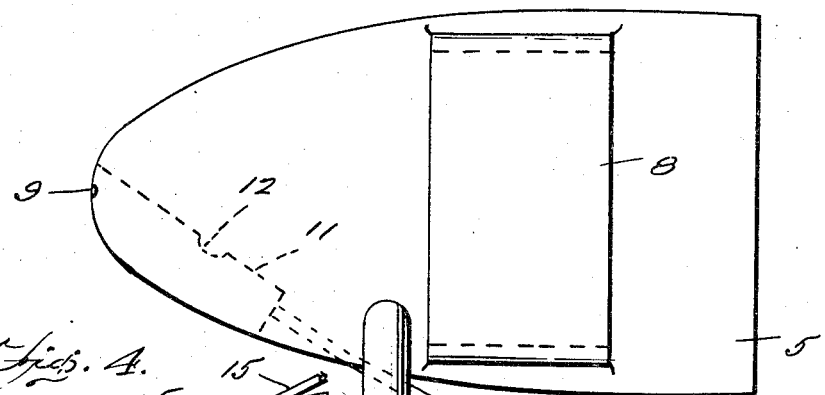
Figure 3 is a bottom plan view of the teat-receiving mouthpiece.
Figure 4:
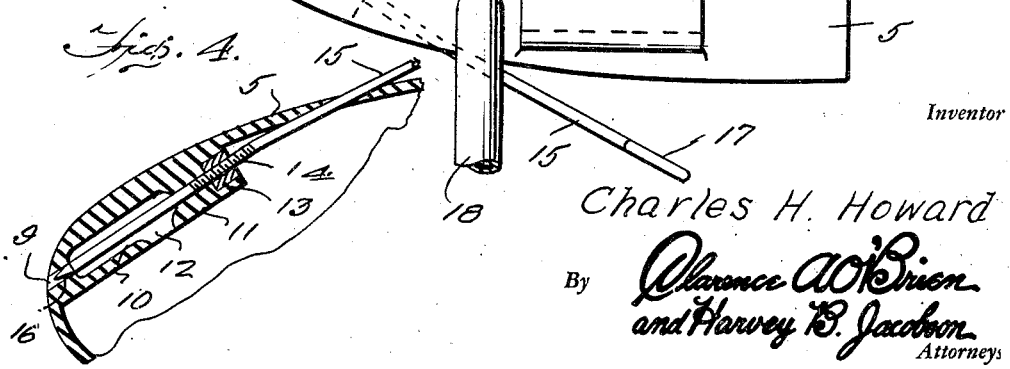
Figure 4 is a fragmentary detailed sectional view showing the valve means of the device shown in Figures 2 and 3.

The calf has a cup-shaped structure 5 which is held in the calf's mouth by mouth and head straps 6, 7, respectively. A member 8 is attached at its ends to the bottom side of the cup-shaped member 5 (which is of soft rubber or like material) and between this and the bottom side of the member 5 the tongue of the calf is disposed.

In one end of the cup-shaped structure 5 is an opening 9 through which the calf can suck milk from the teat of the cow disposed in the cup-like structure 5. This opening 9 is at the outer end of a pocket 10 located within a boss 11 which has an inlet opening 12 communicating the pocket 10 with the interior of the cup-shaped body 5. A nut 13 is embedded in the inner end of the boss 11 for receiving the threaded portion 14 of an elongated stem 15 which is provided with a tapered valve formation 16 at its end disposed within the opening 9. A head 17 is provided at the outer end of the stem 15.

A tube 18 extends from the side of the cup-shaped body 5 and communicates with the interior of the body 5 at the opening 19. (See Figure 2.)

The tube 18 extends to a substantially truncated pyramidal-shaped receptacle 19 from which a plurality of artificial teats 20 depend. A clevis 21 is pivotally connected to the top of the receptacle 19, and a ring 21a is disposed through this clevis 21 and forms part of a supporting harness 22 for the receptacle 19.

It can now be seen, that when the valve 16 is properly set with respect to the opening 9, a calf in sucking will draw milk into the receptacle 5, but the calf will swallow just so much (regulated by the valve 16) while a substantial amount will pass through the tube 18 to a collection receptacle 19.

Obviously, the receptacle 19 may have a suitable pouring neck or other outlet (not shown) and when an accumulation of milk is obtained in the receptacle 19, the same can be detached and another (empty) receptacle attached to the harness on the calf.

The depending flexible teats permit small animals such as pigs to feed from the receptacle 19 while it is being carried by the calf.

A modified form of device is disclosed in Figure 5 wherein a receptacle is indicated at 25 provided with a fitting 26 to permit the same to be connected to the tube 18. This form is characterized by the omission of the teats 20 and is designed solely as a storage receptacle.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A nursing device comprising a teat-receiving calf retained cup having a milk sucking vent therein and a control for said vent, a tongue holding strap at the underside of the cup, and a surplus milk drain from the cup.

2. A nursing device comprising a teat-receiving calf retained cup having a milk sucking vent therein and a control for said vent, a surplus milk drain from the cup, and a receptacle carried by the calf having the cup, said drain leading to the receptacle for accumulating surplus milk.

3. A nursing device comprising a teat-receiving calf retained cup having a milk sucking vent therein and a control for said vent, and a surplus milk drain from the cup, a receptacle carried by the calf having the cup, said drain leading to the receptacle for accumulating surplus milk, and artificial teats depending from the said receptacle.

CHARLES H. HOWARD.